(12) United States Patent
Onodera (10) Patent No.: US 7,390,985 B2
(45) Date of Patent: Jun. 24, 2008

(54) FORCE FEEDBACK INPUT DEVICE

(75) Inventor: Mikio Onodera, Miyagi-ken (JP)

(73) Assignee: Alps Electric Co., Ltd, Tokyo (JP)

( * ) Notice: Subject to any disclaimer, the term of this patent is extended or adjusted under 35 U.S.C. 154(b) by 239 days.

(21) Appl. No.: 11/421,718

(22) Filed: Jun. 1, 2006

(65) Prior Publication Data

US 2006/0284835 A1 Dec. 21, 2006

(30) Foreign Application Priority Data

Jun. 17, 2005 (JP) ............... 2005-177829

(51) Int. Cl.
*H01H 3/40* (2006.01)
(52) U.S. Cl. .................. 200/501; 345/156; 345/184
(58) Field of Classification Search ........... 200/336, 200/501, 564, 570, 17 R; 345/156–184
See application file for complete search history.

(56) References Cited

U.S. PATENT DOCUMENTS

| | | | |
|---|---|---|---|
| 6,636,197 B1 | 10/2003 | Goldenberg et al. | |
| 6,710,565 B2 * | 3/2004 | Maeda | 200/501 |
| 6,828,957 B2 | 12/2004 | Onodera | |
| 6,919,522 B2 * | 7/2005 | Uehira | 200/341 |
| 7,086,292 B2 * | 8/2006 | Onodera | 73/780 |
| 2003/0006958 A1 | 1/2003 | Onodera | |
| 2005/0264524 A1 * | 12/2005 | Onodera | 345/156 |

FOREIGN PATENT DOCUMENTS

| | | |
|---|---|---|
| EP | 1 501 004 | 1/2005 |
| JP | 2003022137 | 1/2003 |

OTHER PUBLICATIONS

Search Report dated Oct. 10, 2006 for corresponding European Patent Application No. 06 01 2322.

* cited by examiner

*Primary Examiner*—Elvin Enad
*Assistant Examiner*—Marina Fishman
(74) *Attorney, Agent, or Firm*—Brinks Hofer Gilson & Lione (57) ABSTRACT

Disclosed is a force feedback input device including a cylindrical operating member having an open bottom. A support member that is rotatable supports a central portion of an inner surface of the operating member, and a motor which is held by the support member. A rotary shaft of the motor is arranged to be perpendicular to a central axis of rotation of the operating member. A great portion of the motor is housed in the operating member. A pinion that is fixed to the rotary shaft of the motor meshes with a ring-shaped gear that is provided at a part shifted from the central axis of rotation of the operating member.

5 Claims, 7 Drawing Sheets

FORCE FEEDBACK INPUT DEVICE

BACKGROUND

1. Field

A force feedback input device that applies feedback force to an operating member is provided.

2. Description of the Related Art

In the related art, there has been suggested a force feedback input device which incorporates the function adjustment of on-vehicle control apparatuses such as air conditioners, audio or navigation systems into one operating member. In this case, when a user rotates the operating member to select an apparatus or to perform the function adjustment of the selected apparatus, output force such as resistant sensation or thrust is applied according to the rotation amount or the rotation direction of the operating member. According to the force feedback input device, favorable operation feeling can be obtained and operationality can be ensured (for example, see JP-A-2003-22137 (pages 5 to 6 and FIG. 1)).

Figure 7:
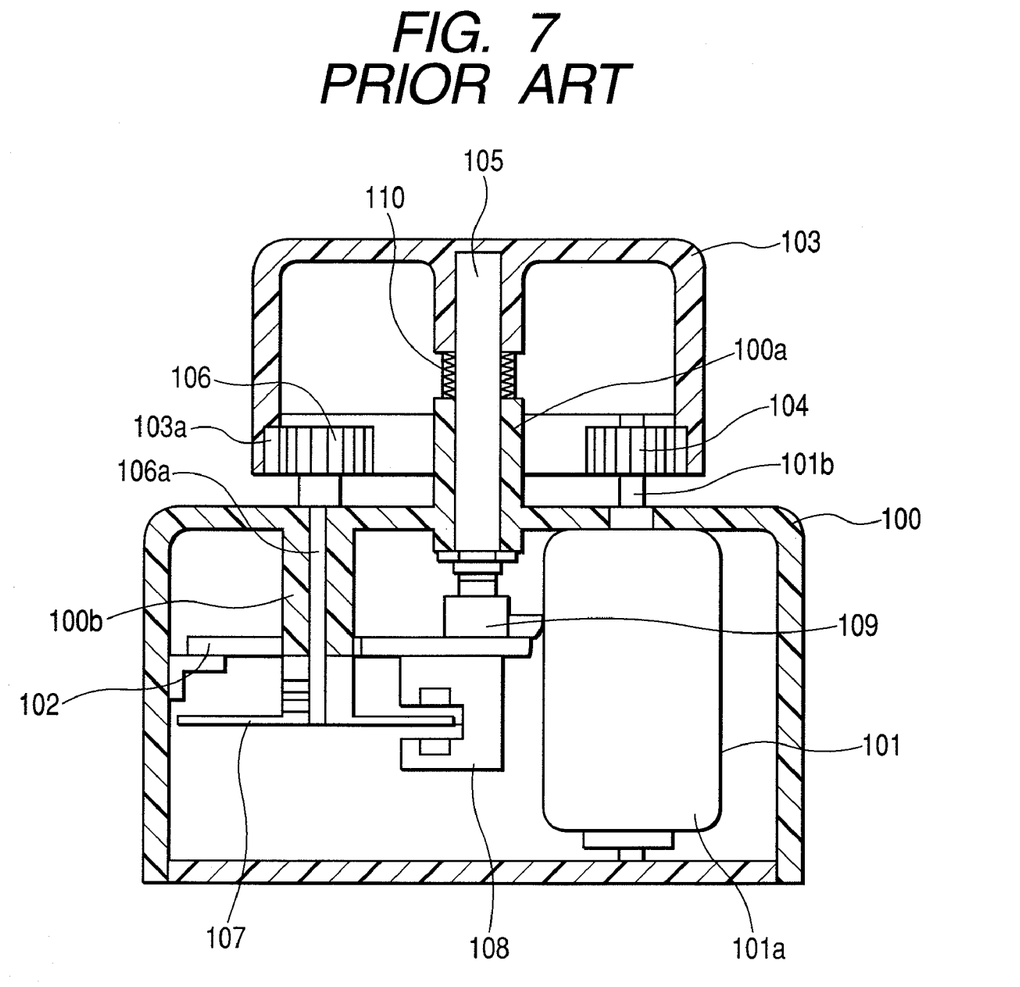
FIG. 7 is a cross-sectional view of a force feedback input device according to the related art.

FIG. 7 is a cross-sectional view showing a force feedback input device according to the related art. The input device includes a boxlike housing 100 having a bearing cylinder 100a at its top wall, a motor 101 and a print board 102 housed in the housing 100, and an operating member 103 provided above the housing 100. The motor 101 has a main body portion 101a and a rotary shaft 101b protruding from the main body portion 101a. The main body portion 101a is fixed to the rear side of the top wall of the housing 100 by screwing. The rotary shaft 101b passes through the top wall of the hosing 100 and protrudes upward. A first gear 104 which is a spur gear is attached to the upper end of the rotary shaft 101b.

The operating member 103 is a cylindrical body with an open bottom. A support shaft 105 which is fixed at a central portion of the inner surface is inserted and held into the bearing cylinder 100a, and the operating member 103 is rotatably supported on the housing 100. Further, in the lower end surface of the operating member 103, a geared portion 103a is provided along the inner circumferential surface. A first gear 104, a second gear 106, and a third gear (not shown) mesh with the geared portion 103a at regular intervals of 120 degrees. The three gears are spur gears having the same diameter or the same number of teeth. A rotary shaft 106a of the second gear 106 is supported by a bearing 100b in the housing 100. At the lower end of the rotary shaft 106a, a code plate 107 is fixed. A photointerrupter 108 which detects rotation information of the code plate 107 is mounted on the rear surface of the print board 102. Further, a push switch 109 is mounted on the surface of the print board 102 to face the lower end of the support shaft 105. Moreover, a spring 110 is interposed between the operating member 103 and the bearing cylinder 100a. The operating member 103 is biased upward by resilient force of the spring 110.

In the force feedback input device having such a schematic configuration, if a user presses the operating member 103 against the resilient force of the spring 110, the push switch 109 is turned on by the support shaft 105, and then a switch signal is output from the push switch 109 to a control unit (not shown). The control unit recognizes on the basis of the switch signal of the push switch 109 that a desired mode (for example, an air-conditioner temperature setting mode) is selected. In this state, if the user rotates the operating member 103, the function adjustment of the selected mode (for example, the up/down adjustment of the set temperature) is performed according to the rotation position of the operating member 103. At the time of the rotation operation of the operating member 103, the first to third gears meshing with the geared portion 103a synchronously rotate, and the code plate 107 rotates in connection with the second gear 106. Accordingly, positional information of the operating member 103 is detected from the photointerrupter 108. The control unit is configured to receive the signal output from the photointerrupter 108 and control driving of the motor 101.

For example, at the time of the adjustment of the set temperature of the air conditioner, whenever the set temperature is changed by one degree, if force opposite to the rotation direction of the operating member 103 is applied to the operating member 103 from the motor 101, the user can recognize the adjusted set temperature by a click feeling.

In the force feedback input device according to the related art, the motor 101 is provided in a longitudinal direction such that the rotary shaft 101b is parallel with the central axis of rotation of the operating member 103. Then, the first gear 104 attached to the rotary shaft 101b meshes with the geared portion 103a provided at the lower end of the inner circumferential surface of the operating member 103. Accordingly, rotation force of the motor 101 is transferred to the operating member 103 through the first gear 104 and the geared portion 103a. Therefore, a great portion of the motor 101 including the main body portion 101a protrudes outward from the lower end of the operating member 103. As a result, there is a problem in that the size of the entire input device is made large in a height direction (longitudinal direction)

SUMMARY

In view of the drawbacks inherent in the related art, a force feedback input device has been provided.

A force feedback input device includes a cylindrical operating member having an open bottom, a support member that rotatably supports a central portion of an inner surface of the operating member, a motor which is held by the support member, and a transfer mechanism which applies rotation force of the motor to the operating member. A rotary shaft of the motor is arranged to be perpendicular to a central axis of rotation of the operating member, and at least a part of the motor is housed in the operating member. Further, the transfer mechanism has a first transfer unit which is provided in the rotary shaft of the motor, and a second transfer unit which is provided at a part shifted from the central axis of rotation of the operating member.

According to this configuration, at least a part of the motor which is provided in a transverse direction to be perpendicular to the central axis of rotation of the operating member is housed in the operating member. Therefore, the size of the entire input device in a height direction (longitudinal direction) can be reduced.

In the above-described configuration, the transfer mechanism may use frictional force between the first and second transfer units formed of rubber members. It is preferable that the first transfer unit have a pinion which is attached to the rotary shaft of the motor, the second transfer unit have a ring-shaped gear portion which is provided at a lower end surface of the operating member, and the pinion and the ring-shaped gear portion are formed by bevel gears.

In this case, it is preferable that the operating member have an exterior member and an interior member which are fixed to each other, and a supported portion supported by the support member and the ring-shaped gear portion be integrally formed in the interior member. With this dual structure, the interior member can be formed of an optimum material for forming the gear. Further, the relative misalignment between the supported portion to be the central axis of rotation of the operating member and the ring-shaped gear portion to be a power transfer unit can be eliminated. As a result, the rotation force of the motor can be smoothly transferred to the operating member.

Further, it is preferable that a skirt portion which extends downward to surround the ring-shaped gear portion be formed in the operating member, and the pinion be disposed inside the skirt portion. According to this configuration, the pinion attached to the rotary shaft of the motor is shielded by the skirt portion of the operating member. Therefore, appearance and stability can be enhanced together.

Further, in the above-described configuration, it is preferable that the support member have a ceiling portion and a pair of side wall portions which are suspended from the ceiling portion, the operating member be rotatably supported by a rotation support portion provided in the ceiling portion, and the motor be housed between the side wall portions. According to this configuration, the operating member can be securely and rotatably supported by the support member, and the motor can be securely held by the support member.

DESCRIPTION

Figure 1:
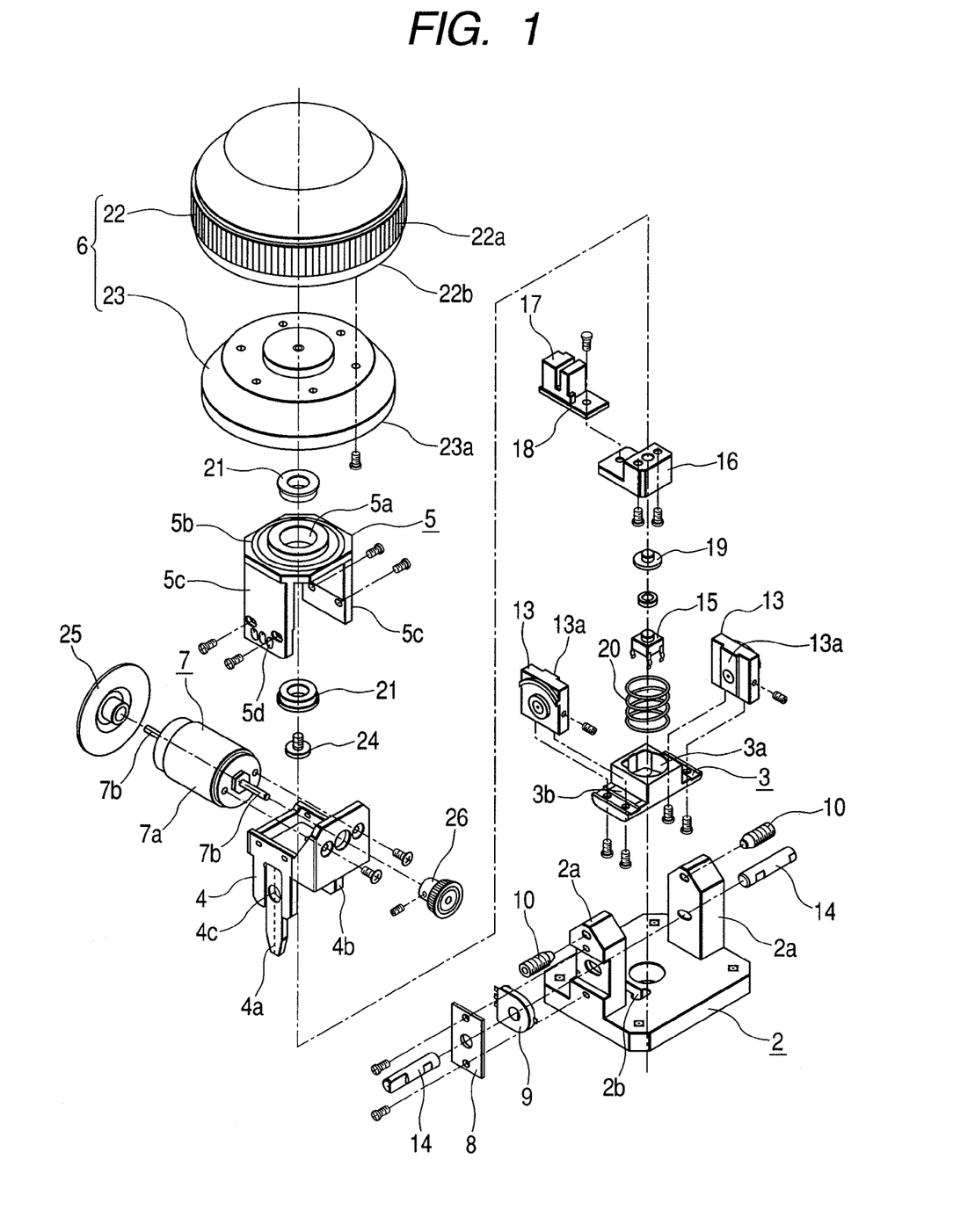
FIG. 1 is an exploded perspective view of a force feedback input device.
Figure 2:
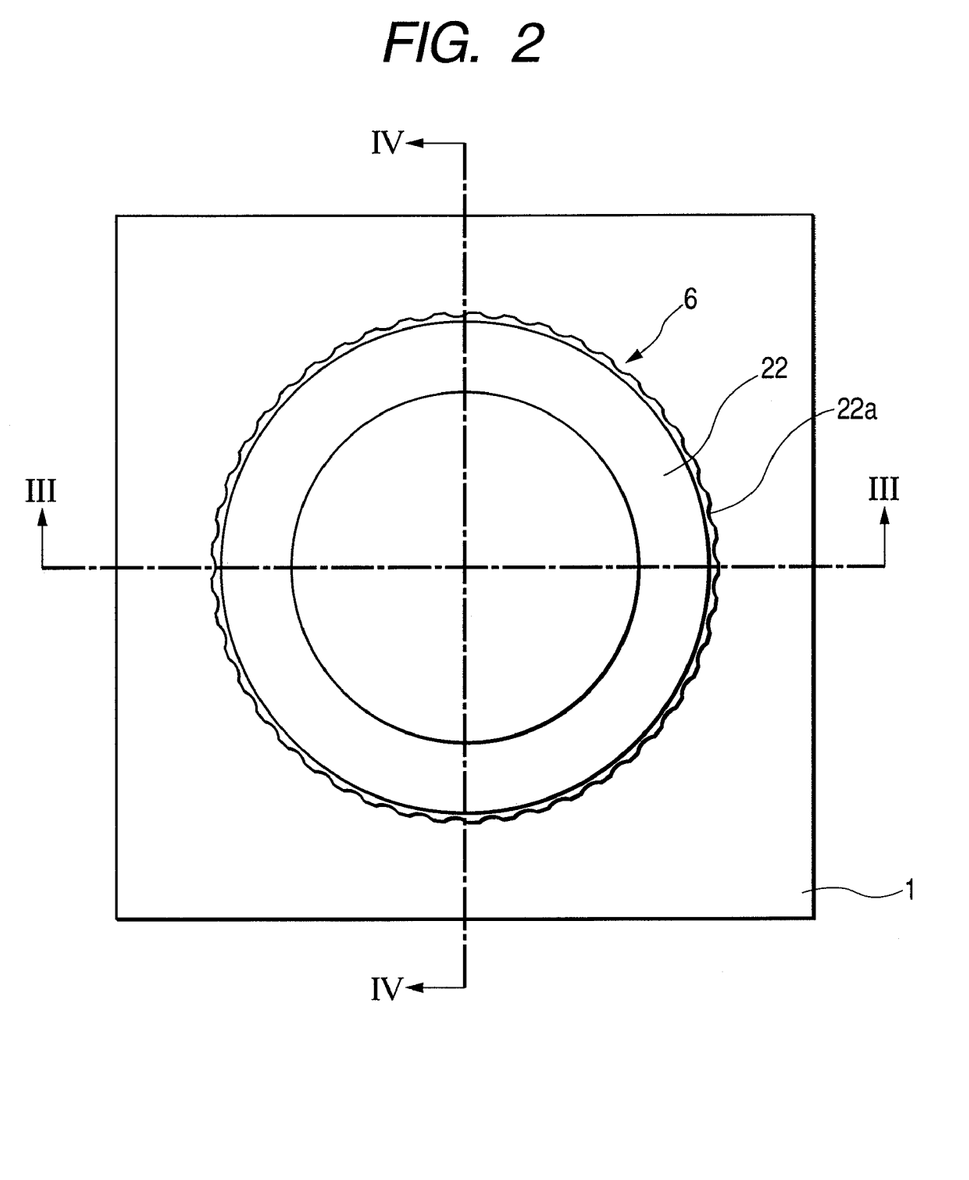
FIG. 2 is a plan view of the force feedback input device.
Figure 3:
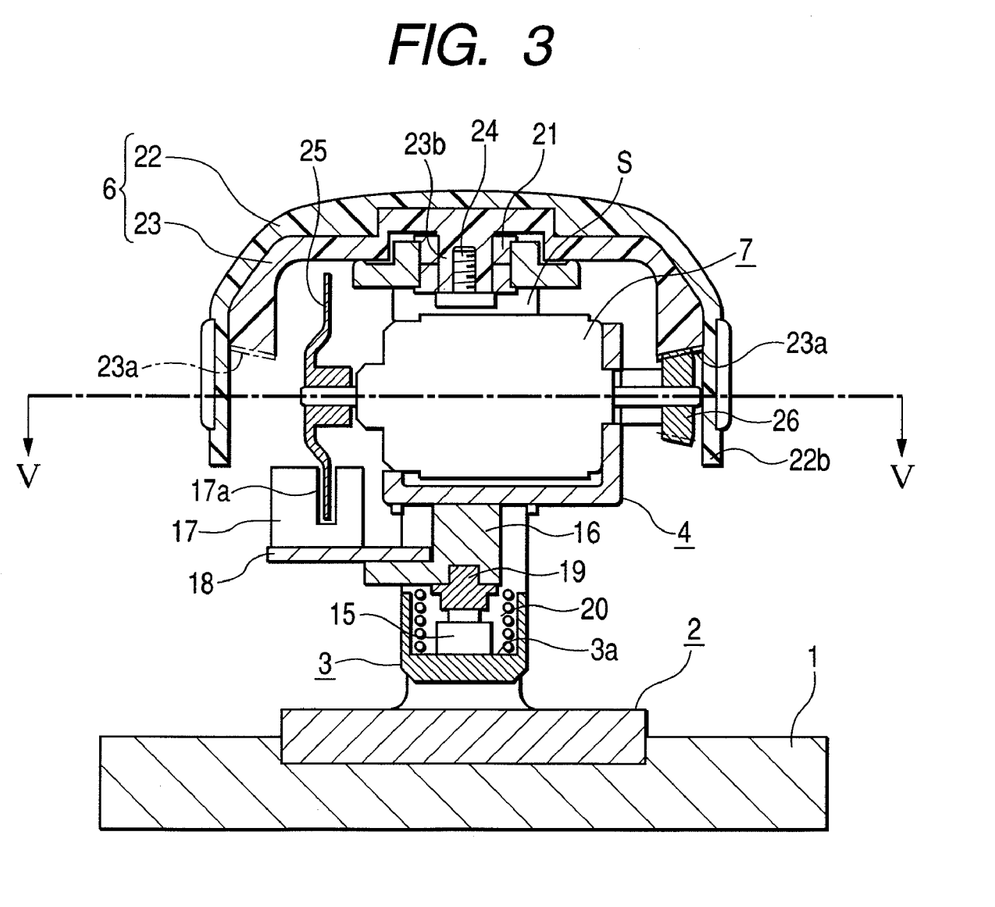
FIG. 3 is a cross-sectional view taken along the line III-III of FIG. 2.
Figure 4:
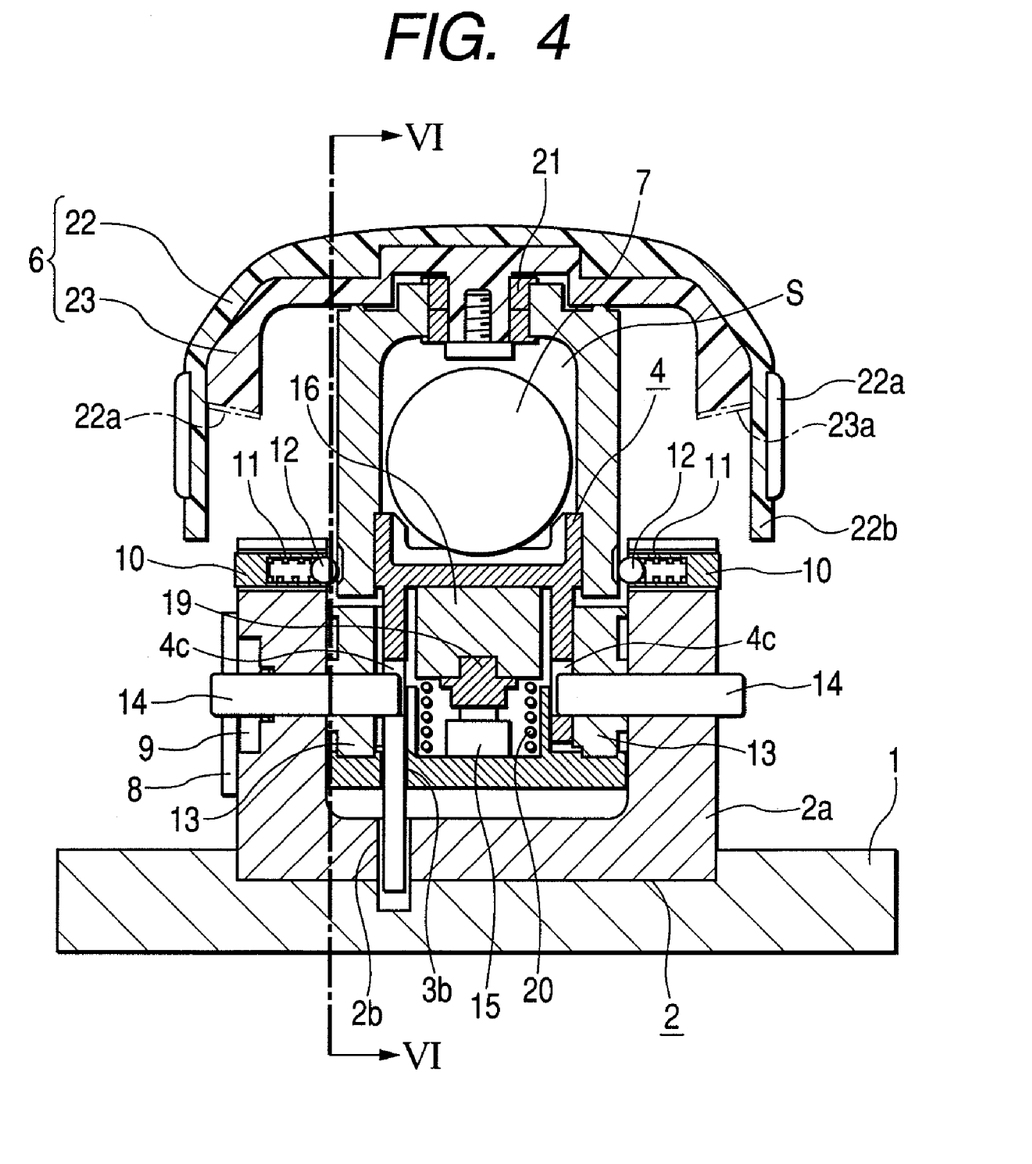
FIG. 4 is a cross-sectional view taken along the line IV-IV of FIG. 2.
Figure 5:
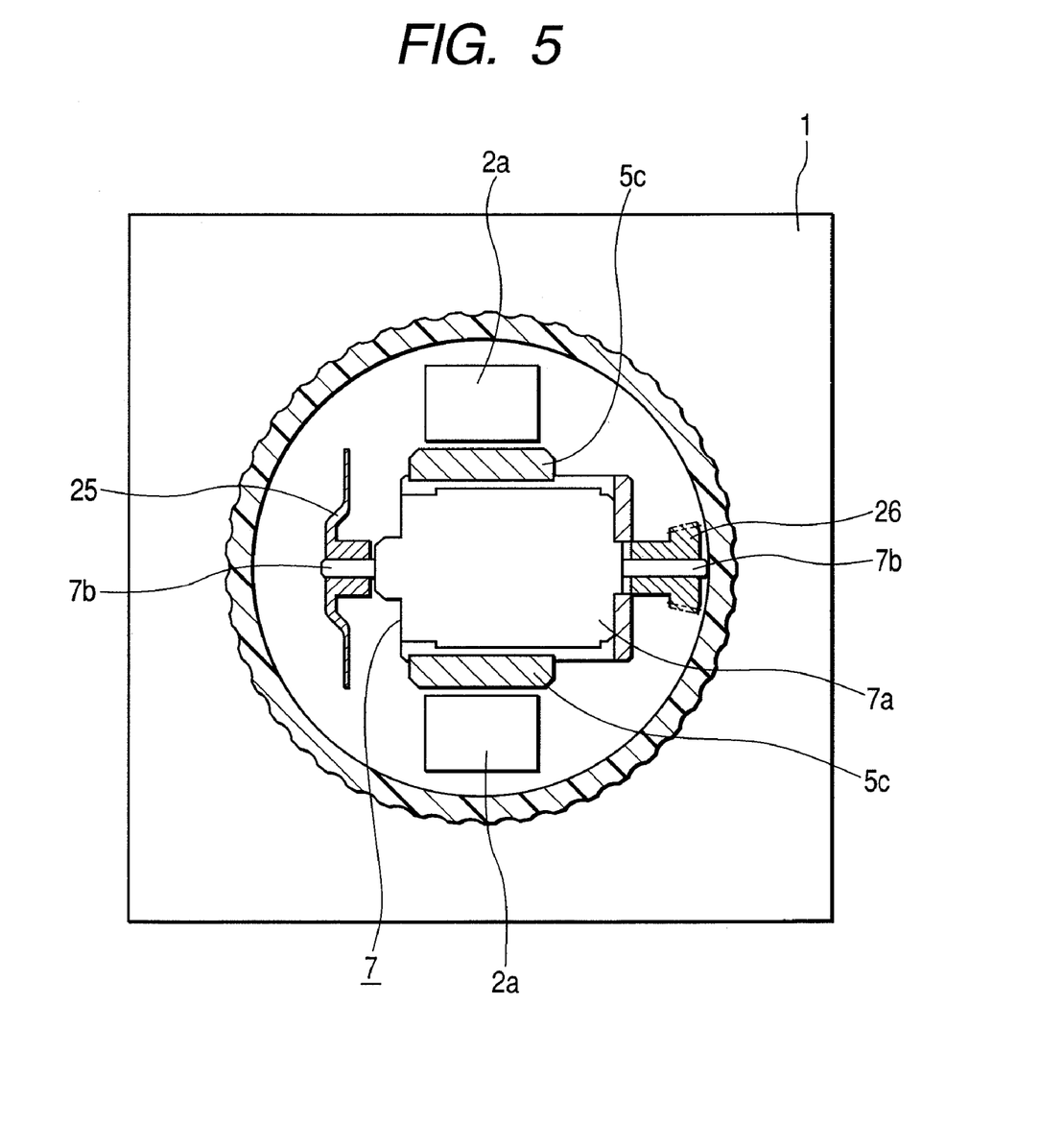
FIG. 5 is a cross-sectional view taken along the line V-V of FIG. 3.
Figure 6:
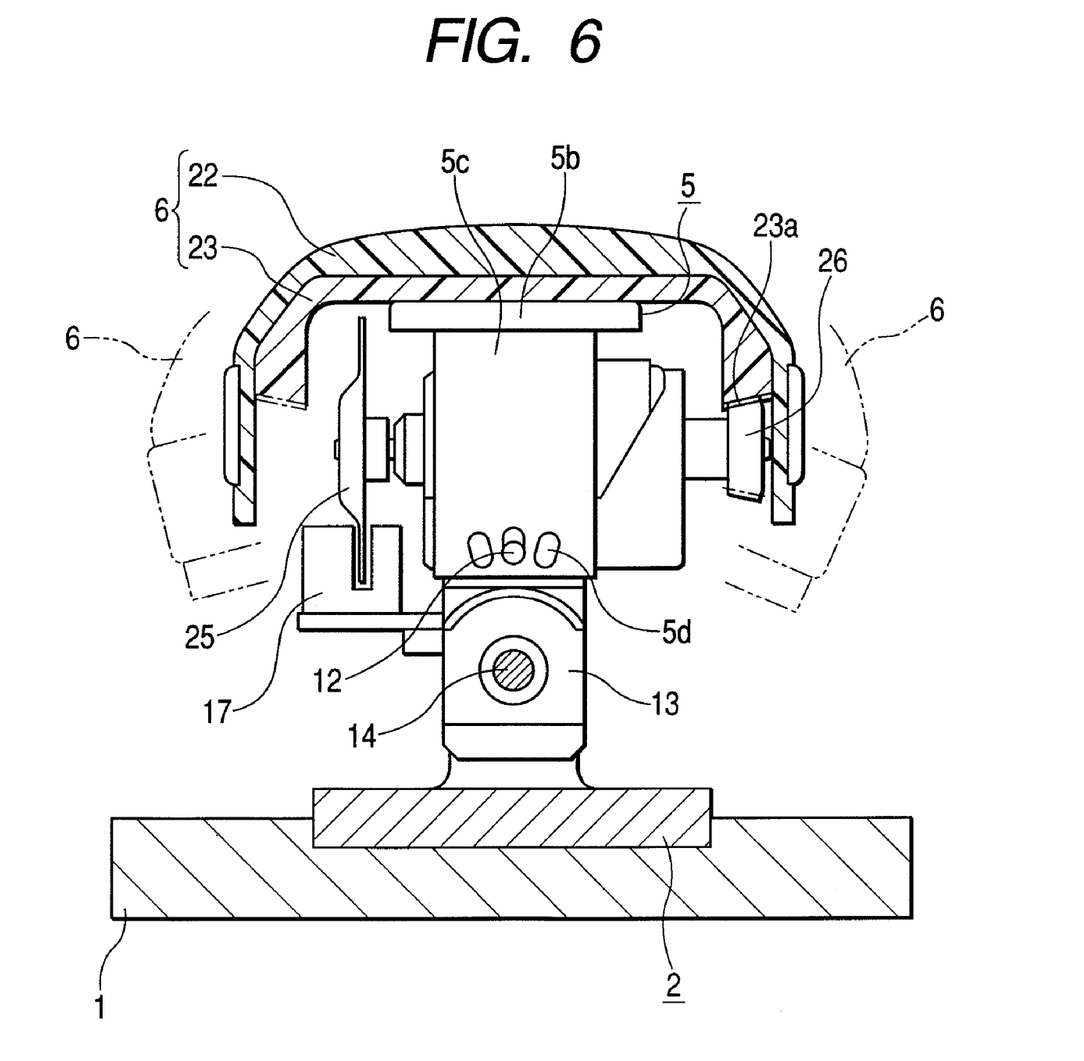
FIG. 6 is a cross-sectional view taken along the line VI-VI of FIG. 4.

A description will be given with reference to the drawings. FIG. 1 is an exploded perspective view of a force feedback input device. FIG. 2 is a plan view of the force feedback input device. FIG. 3 is a cross-sectional view taken along the line III-III of FIG. 2. FIG. 4 is a cross-sectional view taken along the line IV-IV of FIG. 2. FIG. 5 is a cross-sectional view taken along the line V-V of FIG. 3. FIG. 6 is a cross-sectional view taken along the line VI-VI of FIG. 4.

As shown in the drawings, the force feedback input device according to this embodiment includes a base 2 which is fixed onto an installment member 1 in a vehicle such as a center console, a pedestal 3 which is pivotably supported by the base 2, a lower bracket 4 which is pivotably and liftably supported by the base 2, an upper bracket 5 which is incorporated into the lower bracket 4, an operating member 6 which is rotatably supported by the upper bracket 5, and a motor 7 which applies rotation force to the operating member 6.

A pair of supports 2a are provided upright to face each other at a predetermined gap on a flat plate portion of the base 2. A clearance hole 2b is formed in vicinity of the pair of supports 2a. A board 8 is screwed to the outer surface of the support 2a, and a rotary variable resistor 9 is mounted on the board 8. Further, driving bodies 10 are individually attached to the top portions of the supports 2a. As shown in FIG. 4, each of the driving bodies 10 has a ball 12 which is biased by a spring 11.

The pedestal 3 is disposed between the supports 2a of the base 2, and a pair of guide members 13 are screwed to the pedestal 3. Support shafts 14 which individually pass through the supports 2a of the base 2 are correspondingly screwed to the guide members 13. The pedestal 3 is pivotably supported by the base 2 around the support shafts 14. One support shaft 14 passes through the support 2a while engaging with the variable resistor 9. Accordingly, if the support shafts 14 rotate according to the pivot operation of the pedestal 3, a resistance value corresponding to the rotation (pivot) amount is output from the variable resistor 9. A recess 3a is formed at a central portion of the pedestal 3 to be surrounded by a partition wall, and a push switch 15 is loaded into the recess 3a. Further, a through hole 3b is formed on a lateral side of the recess 3a to be located immediately above the clearance hole 2b of the base 2.

Long and short suspended pieces 4a and 4b are provided in the lower bracket 4. The lower bracket 4 is liftably connected to the pedestal 3 with convex portions 13a on inner surfaces of the guide members 13 as guide portions. Long holes 4c are individually formed in the suspended pieces 4a and 4b of the lower bracket 4. Front ends of the support shafts 14 individually fixed to the guide members 13 are correspondingly inserted into the long holes 4c (see FIG. 4). With this configuration, the lower bracket 4 and the pedestal 3 integrally pivot relative to the base 2 around the support shafts 14, while the lower bracket 4 can be close to and away from the pedestal 3. Further, a relay member 16 is screwed to the bottom surface of the lower bracket 4. A board 18 on which a photointerrupter 17 is mounted is screwed to the relay member 16. The photointerrupter 17 is an optical detective element, and has a light-emitting element and a light-receiving element (not shown) arranged to face each other via a recess 17a. In addition, a pusher 19 is provided between the relay member 16 and the push switch 15, and a coil spring 20 is provided between the relay member 16 and the recess 3a of the pedestal 3. The relay member 16 is biased in a direction away from the pedestal 3 (upward) by resilient force of the coil spring 20. Moreover, the long suspended piece 4a passes through the through hole 3b of the pedestal 3 and the clearance hole 2b of the base 2 to reach the installment member 1. If necessary, a detection switch (not shown) can be operated by using the movement of the suspended piece 4a.

The upper bracket 5 has a ceiling portion 5b having a holding hole 5a at its center, and a pair of side wall portions 5c suspended from the ceiling portion 5b. The upper bracket 5 is formed an arch shape on the whole. A bearing 21 to be a rotation support portion is press-fitted into the holding hole 5a. The side wall portions 5c are screwed to the lower bracket 4. With this configuration, the upper bracket 5 and the lower bracket 4 are incorporated to form a support member, and a housing space S, shown in FIG. 4, is defined between the upper bracket 5 and the lower bracket 4. Further, three click recesses 5d are formed in each of the side wall portions 5c. Then, the ball 12 held by the driving body 10 engages with and disengages from the click recess 5d.

The operating member 6 has an exterior member 22 and an interior member 23. The exterior member 22 and the interior member 23 are fixed to each other to be then incorporated by screwing. The exterior member 22 is a resin molded part formed of ABS resin or the like and is molded in a relatively deep dome shape having an open bottom. A fingerhook serration 22a is formed at a lower portion of an outer circumferential surface of the exterior member 22.

The lower portion of the outer circumferential surface of the exterior member 22 including the serration 22a forms a skirt portion 22b. The interior member 23 is a resin molded part formed of acetal resin or the like, and is molded in a relatively shallow dome shape having an open bottom. The lower end of the interior member 23 is located above the inner surface of the skirt portion 22b of the exterior member 22.

A ring-shaped gear 23a which is continuous in a ring shape is provided at a lower end surface of the interior member 23. The ring-shaped gear 23a is a bevel gear having a rotary shaft in a vertical direction. A cylindrical protrusion 23b is formed to serve as a rotary shaft of the ring-shaped gear 23a at the center of the inner surface of the interior member 23. The cylindrical protrusion 23b is supported by the bearing 21 press-fitted into the holding hole 5a of the upper bracket 5. With a bead 24, the cylindrical protrusion 23b is prevented from slipping out of the bearing 21. That is, the cylindrical protrusion 23b is a supported portion which is supported by the upper bracket 5, and the operating member 6 (the exterior member 22 and the interior member 23) are supported by the support member (the upper bracket 5 and the lower bracket 4) with the cylindrical protrusion 23b as the central axis of rotation.

The motor 7 has a main body portion 7a and a rotary shaft 7b which protrudes from both ends of the cylindrical main body portion 7a. The main body portion 7a is screwed to the lower bracket 4. The motor 7 is housed in the housing space S between the upper bracket 5 and the lower bracket 4 such that the rotary shaft 7b is horizontally arranged. The code plate 25 having multiple slits formed along a circumferential direction thereof is fixed to one end of the rotary shaft 7b. As shown in FIG. 3, a part of the code plate 25 is inserted into the recess 17a of the photointerrupter 17, such that rotation information of the code plate 25 is output from the photointerrupter 17. Further, a pinion 26 is fixed to other end of the rotary shaft 7b to mesh with the ring-shaped gear 23a provided at the lower end surface of the interior member 23. The pinion 26 is a bevel gear having a rotary shaft in a horizontal direction. The rotary shaft of the ring-shaped gear 23a and the rotary shaft of the pinion 26 are perpendicular to each other. A great portion of the main body portion 7a and the entire part of the rotary shaft 7b of the motor 7 are housed in the operating member 6. Then, the pinion 26 fixed to the rotary shaft 7b is shielded from the outside by the skirt portion 22b of the exterior member 22.

Moreover, the output signals of the variable resistor 9, the push switch 15, and the photointerrupter 17 are input to the control unit (not shown), and the control unit output a desired control signal to the motor 7 on the basis of these signals.

In the force feedback input device having such a schematic configuration, the user can operate the operating member 6 between an upright position indicated by a solid line of FIG. 6 and a right and left tilt position indicated by a two-dot-chain line of FIG. 6. Further, the user can press and rotate the operating member 6 at the individual positions.

For example, if the operating member 6 located at the position indicated by the solid line of FIG. 6 pivots to the left of the drawing (counterclockwise direction), the operating member 6, the brackets 4 and 5, and the pedestal 3 integrally rotate relative to the base 2 with the support shafts 14 as the central axis of pivot, the ball 12 of the driving body 10 falls into the left click recess 5d of the upper bracket 5 at the time when they rotate by a predetermined degree (for example, 15 degrees). Accordingly, the user can recognize based on the click feeling that the operating member 6 is operated to the left tilt position. At that time, the resistance value corresponding to a pivot angle of the operating member 6 is output from the variable resistor 9 according to the rotation of the support shafts 14, and the output signal is input to the control unit. In this state, if the user presses the operating member 6, the lower bracket 4 moves in a direction close to the pedestal 3. Then, the push switch 15 is pressed by the pusher 19 to be then turned on, and the on signal is input to the control unit.

The control unit recognizes on the basis of the output signal from the variable resistor 9 and the switch signal of the push switch 15 that a desired mode (for example, air-conditioner temperature setting mode) is selected and determined. In this state, if the user rotates the operating member 6, the function adjustment of the selected mode (the up/down adjustment of the set temperature) is performed according to the rotation position of the operating member 6. At the time of the rotation of the operating member 6, the pinion 26 which meshes with the ring-shaped gear 23a of the interior member 23 rotates, and the code plate 25 rotates in connection with the pinion 26. Accordingly, positional information of the operating member 6 is detected from the photointerrupter 17. The above-described control unit receives the signal output from the photointerrupter 17 and outputs a desired control signal to the motor 7. For example, in case of the set temperature adjustment of the air conditioner, force opposite to the rotation direction is applied to the operating member 6 from the motor 7 whenever the set temperature is changed by one degree. As a result, the user can recognize the adjusted set temperature according to the click feeling.

Further, after the operating member 6 which pivoted to the left tilt position of FIG. 6 pivots to the upright position or the right tilt position, if the operating member 6 is pressed at the tilt position, the control unit recognizes based on the output signal from the variable resistor 9 and the switch signal of the push switch 15 that another mode (for example, air-conditioner air volume or blowing position adjustment mode) is selected and determined. In this state, if the user rotates the operating member 6, the function adjustment of the selected mode is performed according to the rotation position of the operating member 6. In this case, the control unit also outputs a desired control signal to the motor 7 on the basis of the positional information of the operating member 6 output from the photointerrupter 17. Various control signals may be output to the motor 7 according to the kinds of modes. In this case, the user can recognize the adjusted air volume or blowing position according to a click feeling different from the case of the air-conditioner temperature setting mode.

As described above, the force feedback input device according to this embodiment includes the cylindrical operating member 6 (the exterior member 22 and the interior member 23) having the open bottom, the support member (the upper bracket 5 and the lower bracket 4) which rotatably supports the central portion of the inner surface of the operating member 6, and the motor 7 which is held by the support member. The rotary shaft 7b of the motor 7 is arranged to be perpendicular to the central axis of rotation of the operating member 6 (the axial center of the cylindrical protrusion 23b). A great portion of the motor 7 is housed in the operating member 6. The pinion 26 which is fixed to the rotary shaft 7b of the motor 7 meshes with the ring-shaped gear 23a which is provided at the part shifted from the central axis of rotation of the operating member 6. Then, the rotation force of the motor 7 is applied to the operating member 6. According to this configuration, at least a part of the motor 7 which is provided in a transverse direction to be perpendicular to the central axis of rotation of the operating member 6 is housed in the operating member 6. Therefore, the size of the entire input device in a height direction (longitudinal direction) can be reduced.

Further, as a transfer mechanism which applies the rotation force of the motor 7 to the operating member 6, the pinion 26 attached to the rotary shaft 7b of the motor 7 and the ring-shaped gear 23a provided at the lower end surface of the interior member 23 are used. The pinion 26 and the ring-shaped gear 23a are formed by the bevel gears whose rotary shafts are perpendicular to each other. With this configuration, the rotation force of the motor 7 can be securely transferred to the operating member 6 without slipping. Further, the operating member 6 has a dual structure of the exterior member 22 and the interior member 23, and the cylindrical protrusion 23b and the ring-shaped gear 23a are integrally formed in the interior member 23. With this configuration, the interior member 23 can be formed of acetal resin or the like which is the most suitable for forming the gear. Further, relative misalignment between the cylindrical protrusion 23b serving as the central axis of rotation of the operating member 6 and the ring-shaped gear 23a serving as a power transfer unit can be eliminated, and thus the rotation force of the motor 7 can be smoothly transferred to the operating member 6.

Further, the skirt portion 22b which extends downward to surround the ring-shaped gear 23a is formed in the exterior member 22 of the operating member 6, and the pinion is disposed inside the skit portion 22b. With this configuration, the pinion 26 attached to the rotary shaft 7b of the motor 7 is shielded by the skirt portion 22b. Therefore, appearance and stability can be enhanced together.

In addition, of the upper bracket 5 and the lower bracket 4 constituting the support member, the upper bracket 5 has the ceiling portion 5b and the pair of side wall portions 5c which are suspended from the ceiling portion 5b. Further, the cylindrical protrusion 23b close to the operating member 6 is rotatably supported by the bearing 21 (rotation support portion) provided at the ceiling portion 5b. In addition, the main body portion 7a of the motor 7 is housed between the side wall portions 5c. With this configuration, the operating member 6 can be securely and rotatably supported by the upper bracket 5, and the motor 7 can be securely held by the upper bracket 5.

Moreover, in the above-described embodiment, a case where a great portion of the motor 7, excluding a portion, is housed in the operating member 6 has been described. Alternatively, the entire portion of the motor 7 may be housed in the operating member 6.

Further, in the above-described embodiment, the case where the exterior member 22 and the interior member 23 constituting the operating member 6 are incorporated by screwing has been described. Alternatively, the exterior member 22 and the interior member 23 may be incorporated by two color molding. Further, the operating member 6 may be formed of a single member.

In the force feedback input device, at least a part of the motor provided in the transverse direction to be perpendicular to the central axis of rotation of the operating member is housed in the operating member. Therefore, the size of the entire input device in the height direction (longitudinal direction) can be reduced.

The invention claimed is:

1. A force feedback input device comprising:
   a cylindrical operating member having an open bottom;
   a support member which rotatably supports a central portion of an inner surface of the operating member;
   a motor that is held by the support member; and
   a transfer mechanism that applies rotation force of the motor to the operating member,
   wherein a rotary shaft of the motor is perpendicular to a central axis of rotation of the operating member,
   at least a part of the motor is housed in the operating member, and
   the transfer mechanism has a first transfer unit that is provided in the rotary shaft of the motor, and a second transfer unit that is provided at a part shifted from the central axis of rotation of the operating member.

2. The force feedback input device according to claim 1,
   wherein the first transfer unit has a pinion that is attached to the rotary shaft of the motor,
   the second transfer unit has a ring-shaped gear portion that is provided at a lower end surface of the operating member, and
   the pinion and the ring-shaped gear portion are formed by bevel gears.

3. The force feedback input device according to claim 2,
   wherein the operating member has an exterior member and an interior member that are fixed to each other, and
   a supported portion that is supported by the support member and the ring-shaped gear portion that are integrally formed in the interior member.

4. The force feedback input device according to claim 2,
   wherein a skirt portion that extends downward to surround the ring-shaped gear portion is in the operating member, and
   the pinion is disposed inside the skirt portion.

5. The force feedback input device according to claim 1,
   wherein the support member has a ceiling portion and a pair of side wall portions that are suspended from the ceiling portion,
   the operating member is rotatably supported by a rotation support portion provided in the ceiling portion, and
   the motor is housed between the side wall portions.

* * * * *